UTILIZING IDENTICAL SIGNAL LEVELS FOR LOGIC AND INHIBIT FUNCTIONS

Filed May 27, 1965

INVENTORS
DAVID H. CHUNG
JAMES L. WALSH

BY David L. Koffsky
ATTORNEY

United States Patent Office 3,418,491

Patented Dec. 24, 1968

3,418,491

UTILIZING IDENTICAL SIGNAL LEVELS FOR LOGIC AND INHIBIT FUNCTIONS

David H. Chung, Dallas, Tex., and James L. Walsh, Hyde Park, N.Y., assignors to International Business Machines Corporation, Armonk, N.Y., a corporation of New York Filed May 27, 1965, Ser. No. 459,195
4 Claims. (Cl. 307—214)

ABSTRACT OF THE DISCLOSURE

A cascode amplifier circuit comprises two transistors, one transistor adapted to receive an input signal, and provide an output; the other transistor being adapted for constant voltage operation. An inhibit transistor, connected to the other transistor, is adapted to receive an input signal and provide an output. Identical signal levels operate the inhibit and one transistor. Operation of the one transistor renders the amplifier conductive. Simultaneous operation of the inhibit and one transistor terminates conduction through the amplifier. When the inhibit signal is dropped, no delay occurs at the amplifier output since no charge storage problems occur in the other transistor.

This invention relates to switching circuits and more particularly to a nonsaturating switching circuit which exhibits an inhibit function.

Present day high speed computer circuits make significant use of nonsaturated transistor operation. These circuits are preferably comprised of like conductivity transistors which operate about preset binary logic voltage levels. There are many forms which such circuits take to perform desired logical connectives. One such connective—the inhibit function—uses a dominant control input to govern the status of one or more logical outputs and is somewhat difficult to economically embody in nonsaturated bilevel transistor logic.

One such inhibition circuit is described and claimed in U.S. Patent 3,099,753 to M. S. Schmookler, entitled, "Three Level Logical Circuits," assigned to the same assignee as is this application. To achieve the inhibit function, the aforesaid patent employs a third logical level which, when applied to the base of one of a number of transistors whose emitters are connected in common to a source of potential, irrevocably reverse biases the emitter base junctions of the other connected transistors. Thus, the application of logical levels to the bases of the reverse biased transistors produces no affect until the inhibit signal is removed from the base of the controlling transistor. The obvious drawback of such a system is that it requires the data processing system to utilize a third logical level. Another means for providing an inhibit function is described in U.S. Patent 3,118,073 to J. L. Walsh, entitled "Nonsaturating Inverter for Logic Circuits," and assigned to the same assignee as is this application. The Walsh patent describes and claims the use of the cascode arrangement of nonsaturating transistors for the purpose of providing the inhibit function. The advantage of the cascode circuit is that identical logical levels perform both the logic functions and the inhibit functions. Notwithstanding, this desirable feature, the cascode circuit begins to exhibit undesirable transient characteristics when operated at the extremely high circuit speeds which are required in modern day data processing systems (to be discussed in greater detail hereinafter).

Accordingly, it is an object of this invention to provide an improved nonsaturating inhibit circuit.

It is still another object of this invention to provide an improved cascode inhibit circuit.

It is still another object of this invention to provide a cascode inhibit circuit which makes use of identical logical levels to perform both logic and inhibit functions.

In accordance with the above stated objects, a cascode inhibit circuit is modified to include a constant voltage translating means between the emitter of an inhibit input semiconductor and the emitter of a logical input semiconductor. The application of an inhibit input renders the inhibit semiconductor conductive and causes a potential shift at its emitter. This emitter potential shift and the constant voltage which appears across the constant voltage translating means combine to unconditionally inhibit conduction in the logical input semiconductor. In this manner, an applied logical input is unconditionally prevented from affecting the output circuit.

The foregoing and other objects, features and advantages of the invention will be apparent from the following more particular description of preferred embodiments of the invention, as illustrated in the accompanying drawings.

Figure 1:
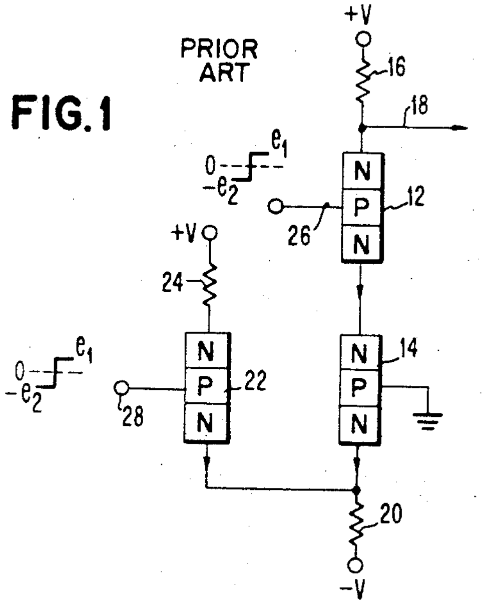
FIG. 1 is a circuit diagram of the prior art cascode inhibit circuit.

Referring now to FIG. 1, a cascode circuit similar to that described and claimed in the aforementioned Walsh U.C. Patent 3,118,073 is shown. The emitter of transistor 12 is connected directly to the collector electrode of transistor 14 to provide a cascode arrangement. A suitable source of potential (+V) is connected via resistor 16 to the collector of transistor 12 and the circuit's logical output is taken via conductor 18 to a succeeding stage of logic. The base circuit of transistor 14 is connected directly to a common potential while its emitter circuit is connected via resistor 20 to a source of suitable operating potential −V. An inhibit transistor 22 has its emitter connected in common with the emitter of transistor 14 to resistor 20 while its collector is connected via resistor 24 to a source of suitable operating potential +V. The logical inputs to the circuit are applied via input terminals 26 and 28 which are respectively connected to the base electrodes of transistors 12 and 22. The logical levels to terminals 26 and 28 are bilevel with the up level ($e_1$) being positive with respect to the common potential and the down level ($-e_2$) being negative with respect to the common potential.

When down potentials are applied to input terminals 26 and 28, both transistors 12 and 22 are rendered nonconductive. Due to the application of the down potential at terminal 26, the emitter potential of transistor 12 is held at a somewhat more negative value than $-e_2$ due to the emitter-base diode drop. The resultant negative potential at the emitter of transistor 12 forward biases the collector-base junction of transistor 14 with a resultant saturation thereof. Due however to the nonconductive state of transistor 12, substantially no current is allowed to flow through transistor 14.

When an up level is applied to input terminal 26, transistor 12 is rendered conductive and the resulting rise in its emitter potential pulls transistor 14 out of saturation. As transistor 14 comes out of saturation, the current through transistor 12 becomes clamped to the reverse biased collector current of transistor 14.

If it is now assumed that an up level is applied to input terminal 28, transistor 22 becomes conductive with a resultant rise in its emitter potential. This rise reverse biases the emitter-base junction of transistor 14 and renders it nonconductive thereby causing the current through transistor 12 to cease.

While the above circuit operates in a satisfactory manner for relatively low speed logical applications, a problem arises in its use as a connective in high speed logic applications. As aforestated, when down levels are applied to input terminals 26 and 28 respectively, transistor 14 is held in a saturated state due to the forward bias of its collector base junction. Since substantially no current flows through the aforementioned junction, a substantial charge is built up thereacross. If up levels are now applied simultaneously to input terminals 26 and 28, no change should be reflected in the output potential on conductor 18. More specifically, while transistor 12 will be rendered conductive by the up level on input terminal 26, transistor 22 will also be rendered conductive and the current flow therethrough will reverse bias the emitter base junction of saturated transistor 14. This action should prevent current flow through transistor 12 and prevent any fall in the output potential on conductor 18. In reality, what happens is that when transistor 14 is rendered nonconductive by the resultant conduction of transistor 22, the conductive state of transistor 12 forms an ideal charging path for the collector-base capacitance of transistor 14. Due to the fact that a substantial negative charge is built up across the collector-base junction of transistor 14 when a down potetnial is applied at the base of transistor 12, the rendering of transistor 12 conductive allows a current to flow through resistor 16 to discharge this negative potential. This results in a substantial drop in the output level of conductor 18 until the collector-base charge in transistor 14 has been dissipated by the charging current through resistor 16. This undesirable phenomenon is not experienced if sufficiently slow rise time logic signals are applied to input terminals 26 and 28. The application of such slow rise time signals provides sufficient time for the discharge of the collector-base capacitance of transistor 14 thereby preventing the aforementioned negative-going signal from appearing on output conductor 18.

Figure 2:
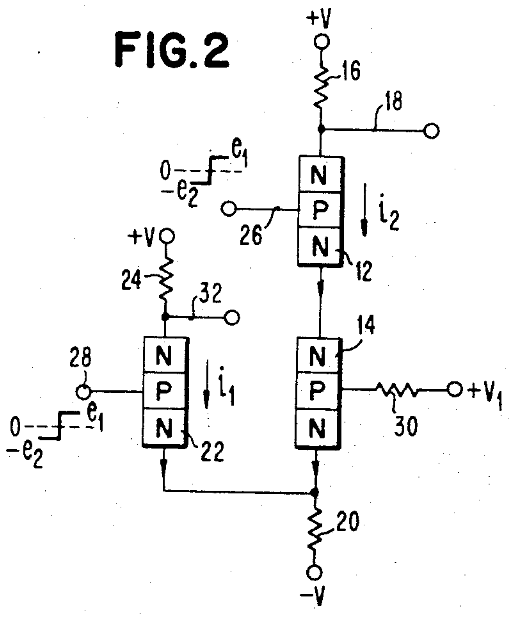
FIG. 2 is a circuit diagram embodying the invention.

Referring now to FIG. 2, the circuit which forms the subject invention is shown. While the circuit of FIG. 2 distinctly resembles that of FIG. 1 (like components are numbered identically in both figures) a significantly changed and improved operation is achieved by attaching via resistor 30 to the base of transistor 14, a source of potential ($+V_1$) which is sufficient in all cases to maintain transistor 14 in continuous saturation. Since all NPN transistors are used in the circuit of FIG. 2, potential source $+V_1$ must be sufficiently positive to forward bias the collector-base junction of transistor 14 when the input to input terminal 26 of transistor 12 is at its most positive state. In this manner, the saturation of transistor 14 is assured under all conditions. In addition, $+V_1$ must sufficiently forward bias the emitter-base junction of transistor 14 to continually assure its conductive state.

The above mentioned circuit change to the base of transistor 14 completely changes the mode of operation of the circuit of FIG. 2 from that of FIG. 1 and greatly improves its logical flexibility. In brief, the controlling factor in the circuit of FIG. 2 is the saturation voltage drop between the collector and emitter of transistor 14. If inhibit transistor 22 is rendered conductive by an up input applied to input terminal 28, the current flowing through resistor 20 raises the emitter potential of transistor 14. This potential rise adds to the saturation drop through transistor 14 and puts a sufficiently high potential on the emitter of transistor 12 to prevent the application of an up input to terminal 26 from rendering it conductive. As can thus be seen, the application of the conditioning signal to transistor 22 completely inhibits any change in output which might result from a logical input to terminal 26 and completely avoids the problem of bringing transistor 14 into or out of saturation with resultant circuit-disturbing charge current flows.

Figure 3:
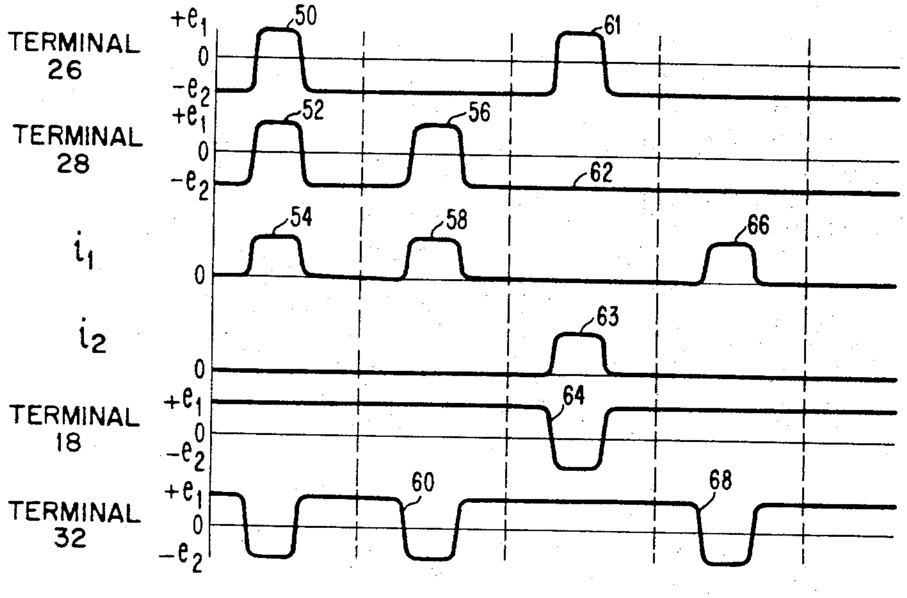
FIG. 3 is a waveform diagram which aids in the explanation of the operation of the circuit of FIG. 2.

Referring now to the waveform diagrams of FIG. 3, the detailed operation of the circuit of FIG. 2 will be described. Assume first that simultaneous up levels of 50 and 52 are applied to terminals 26 and 28 respectively.

As a result of the application of up level 52 to terminal 28, transistor 22 becomes conductive and allows current $i_1$ (waveform 54) to flow therethrough. The flow of current $i_1$ through resistor 20 raises the potential at the emitter of transistor 14. This potential rise in combination with the saturation drop through transistor 14 combine to prevent the emitter-base junction of transistor 12 from being forward biased by up level 50 on input terminal 26. Current $i_2$ is thereby prevented from flowing and there is no change in the output level on conductor 18.

If up logic level ($e_1$) is now applied solely to input terminal 28 (waveform 56) current $i_1$ (waveform 58) is again allowed to flow. The resultant drop in the collector potential of transistor 22 is reflected on output conductor 32 by waveform 60. No change occurs in the output level on conductor 18.

If up logic level $e_1$ is now applied to input terminal 26 (waveform 61) while down logic level 62 is applied to input terminal 28, current $i_2$ (waveform 63) flows while current $i$, does not. The flow of current $i_2$ is unimpeded by either transistor 12 or 14 and the result is a lowering of the potential on output conductor 18 (waveform 64) indicating a logical output.

Assume now that down logic levels ($-e_2$) are applied to both input terminals 26 and 28. The emitter potential of transistor 12 is thereby caused to be at a more negative potential than $-e_2$ by the potential drop across its emitter-base junction. This potential drop adds to the potential drop through transistor 14 (saturation voltage drop) and lowers the potential at the common emitter connection between transistors 14 and 22. This negative potential shift is sufficient to forward bias the emitter base junction of transistor 22 even when a down logic level ($-e_2$) is applied to input terminal 28. As a result, current $i_1$ flows (waveform 66) and the potential on output conductor 32 drops (waveform 68). As can thus be seen, the conduction level of transistor 22 is the direct complement of the conduction level of transistor 12 and provides the desired logical complement output on conductor 32. This is not so in the circuit of FIG. 1 since transistor 22 merely acts as an inverter and its collector potential bears no set logical relationship to the potential on output conductor 18.

While only a single inhibiting transistor 22 has been shown controlling only a single logical output transistor 12, it should be obvious that the number of inhibit transistors and/or logic transistors can be multiplied to allow one or more inhibit transistors to control one or more logical output transistors. Additionally, while the circuits have been embodied in NPN transistor circuitry, other semiconductor devices, e.g., such as PNP transistors, could be used with appropriate changes in bias potentials and logic levels.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An inhibition circuit adapted to utilize identical logic signal levels to perform both logical and inhibition functions, the combination comprising:

first and second input semiconductor means, each said semiconductor means supplied with base, emitter and collector electrodes;

circuit means connecting the emitter electrode of said first semiconductor to a source of operating potential;

constant voltage translation means connected between said emitter electrode of said first semiconductor means and said emitter electrode of said second semiconductor means; and means for applying logic signal levels to the base electrodes of each said first and second semiconductor means, the application of one logic signal level to said first semiconductor means causing conduction therein and a resultant potential shift at its emitter electrode, said potential shift and said voltage translation produced by said constant voltage translation means combining to unconditionally inhibit conduction in said second semiconductor means.

2. An inhibition circuit adapted to utilize logic signal levels to perform both logical and inhibition functions, the combination comprising:

first and second input semiconductor means, each said semiconductor means supplied with base, emitter and collector electrodes;

circuit means connecting the emitter electrode of said first semiconductor to a source of operating potential;

third semiconductor means connected between said emitter electrode of said first semiconductor means and said emitter electrode of said second semiconductor means, said third semiconductor means invariably exhibiting a constant voltage drop thereacross; and means for applying logic signal levels to the base electrodes of each said first and second semiconductor means, the application of one logic signal level to the base electrode of said first semiconductor means causing conduction therein and a resultant potential shift at its emitter electrode, said potential shift and said constant voltage drop across said third semiconductor means combining to unconditionally inhibit conduction in said second semiconductor means.

3. An inhibition circuit adapted to utilize identical logic signal levels to perform either a logical or an inhibition function, the combination comprising:

first and second input transistors, each said transistor supplied with base, emitter and collector electrodes;

circuit means connecting the emitter electrode of said first transistor to a source of operating potential;

a third transistor having an emitter connected to said emitter electrode of said first transistor and a collector connected to said emitter electrode of said second transistor;

potential means connected to the base of said third transistor for maintaining said third transistor in a continual state of saturation; and means for applying logic signal levels to the base electrodes of each said first and second transistors, the application of one logic signal level to said first transistor causing conduction therein and a resultant potential shift at its emitter electrode, said potential shift and said saturation drop across said third transistor combining to unconditionally inhibit conduction in said second transistor when said one logic level is applied to its base electrode.

4. An inhibition circuit adapted to utilize idential logic signal levels to perform both logical and inhibition functions; the combination comprising:

a first transistor having collector, base and emitter electrodes;

a resistor connecting the collector of said first transistor to a source of operating potential;

a first output conductor connected between said resistor and said collector;

a first input connected to the base of said first transistor and adapted to apply first and second logic signal levels to said base;

a second transistor having collector, base and emitter electrodes;

a resistor connecting the collector of said second transistor to a source of operating potential;

a second output conductor connected between said resistor and the collector of said second transistor;

a second input connected to the base of said second transistor and adapted to apply first and second logic signal levels to said base;

a third transistor having collector, base and emitter electrodes; the collector electrode of said third transistor connected to emitter of said first transistor and the emitter electrode of said third transistor connected to the emitter electrode of said second transistor;

a resistor connected between the commonly connected emitters of said second and third transistors and a suitable source of operating potential; and a resistor connected between the base of said third transistor and a source of bias potential, said source of bias potential acting to unconditionally forward bias the collector-base and emitter-base junctions of said third transistor when either said first or second logic signal levels are applied to the bases of said first and second transistors.

References Cited

Steiner, I.B.M. Technical Disclosure Bulletin, vol. 7, No. 10, March 1965, p. 875.

ARTHUR GAUSS, *Primary Examiner.*

D. D. FORRER, *Assistant Examiner.*

U.S. Cl. X.R.

307—203, 217